United States Patent [19]

Watanabe et al.

[11] 3,905,866

[45] Sept. 16, 1975

[54] PROCESS FOR PRODUCTION OF L-LYSINE BY FERMENTATION

[76] Inventors: Kiyoshi Watanabe; Tutomu Tanaka; Tamotsu Hirakawa; Hideaki Kinoshita; Mamoru Sasaki; Koji Obayashi, all of Hyogo, Japan

[73] Assignee: Kanegafuchi Chemical Industries, Osaka, Japan

[22] Filed: Aug. 2, 1973

[21] Appl. No.: 384,844

[30] Foreign Application Priority Data
Aug. 2, 1972  Japan.............................. 47-77978
Aug. 2, 1972  Japan.............................. 47-77979

[52] U.S. Cl............... 195/28 R; 195/47; 195/112
[51] Int. Cl............................................. C12b 1/00
[58] Field of Search............... 195/28 R, 29, 47, 112

[56] References Cited
UNITED STATES PATENTS
3,756,916  10/1973  Leavitt.............................. 195/47
3,759,789  10/1973  Watanabe et al................. 195/28 R

*Primary Examiner*—A. Louis Monacell
*Assistant Examiner*—R. B. Penland
*Attorney, Agent, or Firm*—Sughrue, Rothwell, Mion, Zinn & Macpeak

[57] ABSTRACT

A process for the production of L-lysine by fermentation which comprises cultivating aerobically an L-lysine-producing mutant strain of a microorganism belonging to the Genus Pseudomonas or Achromobacter in a culture medium containing a hydrocarbon as a main carbon source until a substantial amount of L-lysine is accumulated in the culture medium and recovering the thus accumulated L-lysine from the culture broth is disclosed. The mutant strain used in the present invention has a resistance to at least one amino acid or analogue thereof selected from the group consisting of L-valine, α-aminobutyric acid, norvaline, β-hydroxynorvaline, α-amino-β-chlorobutyric acid and L-threonine.

5 Claims, No Drawings

PROCESS FOR PRODUCTION OF L-LYSINE BY FERMENTATION

BACKGROUND OF THE INVENTION

1. FIELD OF THE INVENTION

This invention relates to a process for producing L-lysine from hydrocarbons by fermentation using a microorganism. More particularly, this invention relates to a process for producing L-lysine which comprises aerobically culturing an L-lysine-producing microorganism having a high resistance to L-valine, L-threonine or animo acid analogues of L-valine or L-threonine selected from the mutants belonging to the Genus Pseudomonas and the Genus Achromobacter in a culture medium containing a hydrocarbon as a main carbon source until a substantial amount of L-lysine is accumulated in the culture medium and recovering the thus accumulated L-lysine from the culture broth.

2. DESCRIPTION OF THE PRIOR ART

It is well-known that L-lysine is one of the important essential amino acids and the demand for producing L-lysine inexpensively has steadily been increased particularly from the standpoint of use for the supplements or additives to cereals as main diets for human being.

Various processes have been proposed for producing L-lysine by fermentation, and some processes utilizing inexpensive hydrocarbons as carbon sources have bceen described in publications (for example, British Pat. Nos. 1,184,530, 1,186,989 and 1,241,901, etc.). However, these well-known processes are disadvantageous in that the yield of the desired L-lysine is low and therefore processes which are advantageous in industrial production of L-lysine have not yet been established.

It is also known that some microorganisms belonging to the Genus Pseudomonas (French Pat. No. 2,041,650) or the Genus Achromobacter [Agr. Biol. Chem. 27 (11), pp 773-783 (1963)] produce L-lysine from hydrocarbons. However, it is very difficult to utilize these known microorganisms in the industrial production of L-lysine since the accumulated amount of L-lysine is extremely low, e.g., on the order of 0.3 to 1.6 g/l.

Further, it is known that L-lysine can be produced using a microorganism which is resistant to threonine, α-amino-β-hydroxyvaleric acid, norleucine, α-aminobutyric acid or the like (German Pat. No. 2,034,406), but this process utilizes one of homoserine-requiring microorganisms (Genus Brevibacterium, Genus Corynebacterium, Genus Arthrobacter, Genus Microbacterium and Genus Nocardia) and carbohydrates as carbon sources.

SUMMARY OF THE INVENTION

As a result of extensive studies on the isolation of various microorganisms having a high ability to utilize hydrocarbons from the soil followed by screening of the isolated microorganisms, the present inventors unexpectedly found that a significant amount of L-lysine can be accumulated in the culture broth by subjecting the bacteria belonging to the Genus Pseudomonas and the Genus Achromobacter to a mutational treatment, isolating the thus obtained mutant, i.e., L-valine-, L-threonine-, L-valine analogue- or L-threonine analogue-resistant strain and culturing the isolated strain aerobically in a culture medium containing a hydrocarbon as a mian carbon source until a substantial amount of L-lysine is accumulated in the culture broth.

As described above, it is known that some strains belonging to the Genus Pseudomonas and the Genus Achromobacter produce a small amount of L-lysine. Contrary to the prior art, in accordance with the present invention, a strain which is capable of producing L-lysine in a high yield is isolated on the basis of the finding, e.g., a correlation between L-valine-sensitivity and L-lysine productivity, and the thus isolated strain is greatly improved in the L-lysine productivity.

That is, the present inventors found that when *Pseudomonas brevis* is cultured using ethanol as a carbon source, this strain exhibits a valine-sensitivity, i.e., the growth of *Pseudomonas brevis* is extremely inhibited in the presence of L-valine. Further, they found that the accumulation of L-lysine can be increased by isolating a novel strain having a weak L-valine sensitivity, i.e., an L-valine-resistant strain obtained by artificial mutation and aerobically culturing the L-valine-resistant strain using a hydrocarbon as a carbon source. That is, these findings indicate that L-lysine productivity can be increased and improved as the valine-resistance of the above strain increases. On the basis of these findings, the present inventors have established a novel technique which makes it possible to find out the microorganisms having an ability to produce L-lysine in high yields by isolating the strains which are resistant to an amino acid such as L-valine or L-threonine, or to a so-called amino acid-analogue known as L-valine- or L-threonine-analogue, i.e., α-amino-n-butyric acid, α-amino-β-chlorobutyric acid, norvaline, β-hydroxynorvaline or the like.

As described previously, it is well known that certain microorganisms requiring homoserine as a growth factor produce L-lysine by fermentation using carbohydrates as carbon sources (German Pat. No. 2,034,406). However, the present invention is directed to the production of L-lysine comprising culturing an L-lysine-producing microorganism belonging to the Genus Pseudomonas and the Genus Achromobacter which utilizes hydrocarbons and does not require any nutrient as a growth factor.

The microorganisms used in the present invention are newly isolated from the soil by the present inventors, and, upon comparison of their microbiological properties in accordance with the criteria given in Bergey's Manual of Determinative Bacteriology, 7th Edition, none of the microorganisms used in the present invention has conformity with the well-known microorganisms. Thus, the microorganisms used in the present invention are considered to be novel strains and designated as *Pseudomonas brevis* No. 22 (ATCC 21940) and *Achromobacter coagulans* No. 42 (ATCC 21934) and are now deposited at the American Type Culture Collection under the assigned numbers as described above.

The microbiological properties of *Pseudomonas brevis* and *Achromobacter coagulans* are as follows:

| Pseudomonas brevis | Achromobacter coagulans |
|---|---|
| 1. Microscopic Observation | |
| short rods having round | short ends; having round |

| Pseudomonas brevis | Achromobacter coagulans |
|---|---|
| ends; size: 0.7 ~ 1.0 × 1.5 ~ 2.0 μ<br>no movement<br>no spore formation<br>acid-fast stain: negative<br>Gram stain: negative | rods; size: 0.8 ~ 1.0 × 1.5 ~ 3.0 μ<br>no movement<br>no spore formation<br>acid-fast stain: negative<br>Gram stain: negative |
| II. Cultural Characteristics | |
| (1) Growth on Nutrient Agar Plate (33°C, 3 days)<br>round colony of 1.5 ~ 2.0 m/m; complete margin<br>grayish white, glossy and smooth surface | round colony; complete margin<br>milky white, glossy and smooth surface |
| (2) Growth on Nutrient Agar Slant Medium<br>linear<br>grayish white<br>glossy and smooth surface | linear<br>milky white<br>glossy and smooth surface |
| (3) Growth on Nutrient Broth<br>Uniformly turbidity;<br>precipitate formed | sometimes thin membrane on surface; sometimes granular growth; precipitate formed |
| (4) Stick Culture on Nutrient Gelatin<br>no liquefaction<br>brown soluble pigment<br>growth on surface | liquefaction<br>growth on surface |
| (5) Litmus Milk<br>acidic<br>coagulation | weak alkaline to neutral<br>coagulation and decolorization |
| III. Physiological Properties | |
| (1) Nitrate Reduction (synthetic medium)<br>positive | positive |
| (3) VP Reaction<br>negative | negative |
| (4) Indole Production<br>negative | negative |
| (5) Hydrogen Sulfide Production<br>negative to weak positive | weak positive |
| (6) Starch Hydrolysis<br>negative | negative |
| (7) Citric Acid Utilization<br>positive | positive |
| (8) Urease<br>positive | negative |
| (9) Catalase<br>positive | positive |
| (10) Acid Production from Sugars<br>produced from xylose, glucose, mannose and galactose within 10 days; produced from lactose within 30 days; only slightly produced from arabinose and fructose; no production from maltose, sucrose, trehalose, sorbitol, mannitol, inositol, glycerol and starch | no production from arabinose, fructose, xylose, glucose, mannose, lactose, maltose, sucrose, trehalose, sorbitol, mannitol, inositol, glycerol, starch and galactose |
| (11) Utilization of Carbon Sources<br>growth in $C_{10} \sim C_{20}$ n-paraffin<br>growth in acetic acid, citric acid, succinic acid, ethanol and propanol | growth in $C_{10} \sim C_{20}$ n-paraffin<br>growth in acetic acid, succinic acid, citric acid and ethanol |
| (12) Nutrient Requirements<br>none | none |
| (13) Optimum Growth Temperature<br>33°C | 33°C |
| (14) Growable pH Values<br>5.5 ~ 9.0 | 5.5 ~ 9.0 |
| (15) aerobic (for oxygen) | aerobic (for oxygen) |
| IV. Isolation Source | |
| soil | soil |

According to the present invention, L-lysine can be produced advantageously by isolating the above-described amino acid analogue-resistant or amino acid-resistant strain after mutational treatment of microorganism of the Genus Pseudomonas or the Genus Achromobacter and culturing the thus isolated strain in a culture medium containing a hydrocarbon as a carbon source. Two or more amino acids or amino acid analogues may be used to produce a strain which is resistant to the amino compound used. In addition, it is also possible to effect the mutational treatments repeatedly using two or more amino acids or analogues thereof alternately.

The mutational treatment may be carried out by the conventional chemical or physical treatments commonly employed in producing mutants, for example, by using the well-known mutagenic agents such as N-methyl-N'-nitro-N-nitrosoguanidine, or the physical mutational treatment such as irradiation with ultraviolet rays, radio-active rays or other procedures.

A typical procedure for producing an L-valine-resistant strain comprises culturing a mutant obtained by a usual mutational treatment from a strain of the Genus Pseudomonas or Achromobacter in a minimum culture medium containing L-valine and ethanol (preferably 0.5 to 1.0% by weight of ethanol based on the total weight of the medium) as a carbon source for a period of 3 to 5 days to obtain a culture enriched with L-valine-resistant strain. A cell suspension thus prepared which is previously diluted with a physiological saline solution to an appropriate cell concentration is then spread onto a minimal medium, an agar plate, containing L-valine or α-amino-butyric acid at a concentration more than 0.5 mg/ (using 0.5 to 1.0% ethanol as a carbon source) followed by being cultivated. Of colonies produced after 3 to 5 days' cultivation, relatively large colonies are harvested. Alternatively, it is also possible to replace L-valine used above by the above-described various analogues or L-threonine at a concentration more than 0.5 mg/ml for the enrichment culture. It is also possible to culture the mutationally treated strain by directly streaking on a minimal medium, an agar plate containing above amino acids or amino acid analogues. These strains were often found to have an increased L-valine-resistance.

It is generally important to increase the L-valine-resistance of the mutant stepwise by subjecting the mutant to the above mutational treatments repeatedly. In producing a resistant strain it is generally necessary to predetermine the optimum culture conditions in order to impart to the microorganism the strongest sensitivity to amino acids or amino acid analogues used for the mutational treatment. For this purpose, the selection of a carbon source to be used in the culture medium and the combination of various amino acids or amino acid analogues (two or more agents) should carefully be investigated. To this effect, the most preferably carbon source for L-valine-resistant strain is found to be ethanol.

In carrying out the L-lysine production in accordance with the present invention, an L-valine-resistant strain is aerobically cultured by the well-known culturing technique in the culture medium containing a hydrocarbon as a main carbon source, a nitrogen source, inorganic salts and other additives.

Hydrocarbons which can preferably be used in the culture medium for lysine production of this invention are n-paraffins containing 10 to 20 carbon, preferably 13 to 18, atoms or kerosene.

Nitrogen sources which can be used in the culture medium include organic and inorganic ammonium salts such as ammonium sulfate, ammonium nitrate, ammonium chloride, ammonium acetate, ammonium citrate, ammonium succinate and the like, urea and ammonia.

Inorganic salts used in the present invention include potassium phosphate, magnesium sulfate, manganese sulfate, zinc sulfate, copper sulfate, ferrous sulfate, calcium carbonate and the like and added at a concentration commonly employed.

In addition, surface active agents, for example, polyoxyethylene sorbitan mono- or trioleate (Tween 80 or 85, manufactured by Atlas Powder Co., U.S.A.) may be effectively used in the culture medium in an amount of approximately 0.02 to 0.5% by weight based on the total amount of the culture medium.

The pH value of the culture medium is preferably maintained in the range of from about 6 to about 9, preferably 6.5 to 8.0, during the whole period of cultivation. The cultivation is usually carried out at a temperature of from about 25° to about 40°C, preferably 30° to 35°C.

It is necessary to conduct the cultivation under an aerobic condition, for example, by stirring with aeration and/or shake-culturing.

Upon completion of the cultivation, the resulting microbial cells are removed from the culture broth by the well-known procedure such as filtration or centrifugation. The removal of the microbial cells can easily be conducted by heating the culture broth, for example, at a temperature of from 70° to 95°C for a period of from 10 to 30 minutes and removing the microbial cells, although the heating is not essential. The desired L-lysine can be obtained from the filtrate or the supernatant in the form of L-lysine hydrochloride in accordance with the well-known procedure using an ion-exchange resin such as Amberlite IRC-50, Amberlite IR-120 (available from Rohm & Haas Co.) and the like.

Alternatively, a powder enriched in L-lysine can be obtained by extracting the culture broth or a filtrate (or a supernatant) obtained for the culture broth with a solvent such as n-hexane to extract any residual hydrocarbon used as a carbon source, concentrating the resulting broth under reduced pressure with or without removal of the microbial cells by filtration and finally drying the resulting concentrate by drumdrying, spray-drying and the like.

The present invention is further illustrated by the following examples but they are not to be construed as limiting the scope of this invention.

EXAMPLE 1

*Pseudomonas brevis* No. 22 (ATCC 21940) was treated with N-methyl-N'-nitro-N-nitrosoguanidine followed by being cultivated in a culture medium containing L-valine or DL-α-amino-n-butyric acid at a concentration more than 0.5 mg/ml. By repeating mutational treatments and increasing the concentration of L-valine or DL-α-amino-n-butyric acid, the L-valine-resistant strains No. 73 and No. 56 derived from *Pseudomonas brevis* No. 22 (ATCC 21940) were isolated from minimal agar plates which contained L-valine or DL-α-amino-n-butyric acid.

Each of *Pseudomonas brevis* strains No. 22 (ATCC 21940), No. 73 and No. 56 (ATCC 21941) was cultivated on a bouillon slant medium at a temperature of 33°C overnight. A platinum loopful amount of each of the cultures was inoculated in a culture medium for L-lysine production having the following composition and then shake-cultured at a temperature of 33°C for 7 days.

After completion of cultivation, the amount of the accumulated L-lysine was quantitatively determined by the conventional method. The results observed in the L-valine-sensitivity test for the parent strain *Pseudomonas brevis* No. 22 (ATCC 21940) and mutants *Pseudomonas brevis* No. 73 and *Pseudomonas brevis* No. 56 (ATCC 21941), and the accumulated amount of L-lysine in each case are shown in Table 1 below.

As is apparent from the results shown in Table 1, it was found that the increase in L-valine-resistance would result in the remarkable increase in the productivity of L-lysine.

Table 1

| | | | Growth[1] | | | | | |
|---|---|---|---|---|---|---|---|---|
| | | | Strain A[2] | | Strain B[2] | | Strain C[2] | |
| | | | 18 | 48 | 18 | 48 | 18 | 48 | (hrs.) |
| Valine-Resistance Test[3] | L-Valine | 0 γ/ml | + | + | + | + | + | + |
| | | 20 | − | + | ± | + | + | + |
| | | 50 | − | + | − | + | + | + |
| | | 100 | − | + | − | + | + | + |
| | | 200 | − | − | − | + | + | + |
| | | 500 | − | − | − | − | ± | + |
| | | 1000 | − | − | − | − | − | + |
| | | 2000 | − | − | − | − | − | + |
| | | 5000 | − | − | − | − | − | + |
| | | 10000 | − | − | − | − | − | − |
| | L-Valine-Resistance | | 100 γ/ml | | 200 γ/ml | | 5000 γ/ml | |
| Amount of L-Lysine (Hydrochloride) Accumulated in Medium After 7 Days' Cultivation (g/l)[4] | | | 0.6 | | 8.4 | | 25.0 | |

Note: (1) Growth:    +   Growth
                 ±   Slight growth
                 −   No growth
(2) Strain A: Pseudomonas brevis No. 22 (ATCC 21940)
     Strain B: Pseudomonas brevis No. 73
     Strain C: Pseudomonas brevis No. 56 (ATCC 21941)
(3) L-Valine-Resistance Test:
(Medium)

| | |
|---|---|
| 75% phosphoric acid | 12 ml |
| $(NH_4)_2SO_4$ | 6 g |
| NaCl | 1 g |
| $MgSO_4 \cdot 7H_2O$ | 0.2 g |
| $CaCl_2 \cdot 2H_2O$ | 0.1 g |
| $FeSO_4 \cdot 7H_2O$ | 0.1 g |
| $ZnSO_4 \cdot 7H_2O$ | 0.03 g |
| $MnSO_4 \cdot 4H_2O$ | 0.002 g |
| KOH | 14 g |
| pure water | 1000 ml |
| pH | 7.0 |

10 ml. portions of the above medium were poured into large test tubes and sterilized. To each of the tubes was added 0.1 ml of 60% ethanol as a carbon source to an ethanol concentration of about 0.6%. Each medium was inoculated with a suspension of each strain (which had been cultured for 24 hours on a slant medium) in such an amount that the strain concentration in the medium would be $10^6 \sim 10^7$ cells/ml, and then shake-cultured at a temperature of 33°C. The L-valine-resistance was referred to as the maximum L-valine concentration at which the strain is growable.

(4) Medium for Lysine Production:

| | |
|---|---|
| n-paraffin ($C_{11} \sim C_{18}$) | 10% (w/v) |
| $K_2HPO_4$ | 0.1% |
| $KH_2PO_4$ | 0.1% |
| $MgSO_4 \cdot 7H_2O$ | 0.1% |
| $FeSO_4 \cdot 7H_2O$ | 0.002% |
| $ZnSO_4 \cdot 7H_2O$ | 0.002% |
| $MnSO_4 \cdot 4H_2O$ | 0.01% |
| Tween 85* | 0.1% |
| $CaCO_3$** | 3.0% |
| $(NH_4)_2SO_4$ | 3.0% |
| pH | 7.0 |

*manufactured by Atlas Powder Co., U.S.A.
30 ml portions of the above medium were poured into 500 ml shake-flasks and then sterilized at 120°C for 15 minutes.
**Calcium carbonate was added to the medium after sterilized separately.

EXAMPLE 2

Achromobacter coagulans No. 42 (ATCC 21934) was treated with a mutagenic agent, N-methyl-N'-nitro-N-nitrosoguanidine, to obtain Achromobacter coagulans No. 36 (ATCC 21935) which is resistant to DL-norvaline. The resulting strain was then cultivated on a bouillon slant medium overnight. A platinum loopful amount of the culture was then inoculated in a fermentation medium having the following composition and shake-cultured at a temperature of 33°C for 7 days. Quantitative determination of L-lysine indicated that L-lysine hydrochloride was accumulated in the medium in an amount of 4.8 g/l for Achromobacter coagulans No. 36 (ATCC 21935) whereas the amount of L-lysine hydrochloride accumulated by the parent strain, Achromobacter coagulans No. 42 (ATCC 21934), was found to be 0.5 g/l:

Medium for Lysine Fermentation

| | |
|---|---|
| n-paraffin ($C_{11} \sim C_{18}$) | 10% (w/v) |
| $(NH_4)_2SO_4$ | 3% |
| $KH_2PO_4$ | 0.1% |
| $K_2HPO_4$ | 0.1% |
| $MgSO_4 \cdot 7H_2O$ | 0.1% |
| $FeSO_4 \cdot 7H_2O$ | 0.004% |
| $ZnSO_4 \cdot 7H_2O$ | 0.002% |
| $MnSO_4 \cdot 4H_2O$ | 0.002% |
| Tween 85* | 0.1% |
| $CaCO_3$** | 3.0% |
| pH | 7.0 |

*manufactured by Atlas Powder Co., U.S.A.
**$CaCO_3$ was added to the medium after sterilized separately.

30 ml portion of the above medium was poured into a 500 ml shake-flask and sterilized at a temperature of 120°C for 15 minutes.

EXAMPLE 3

Achromobacter coagulans No. 17 and Achromobacter coagulans No. 49 (ATCC 21936) which are DL-α-amino-n-butyric acid resistant strains were obtained by mutational treatment with N-methyl-N'-nitro-N-nitrosoguanidine from Achromobacter coagulans No. 42 (ATCC 21934) and Achromobacter coagulans No. 36 (ATCC 21935) which is an norvaline-resistant strain, respectively. These strains thus obtained were then shake-cultured in the medium for lysine fermentation as described in Example 2 at a temperature of 33°C for 7 days. The amount of L-lysine hydrochloride accumulated was found to be 3.2 g/l for *Achromobacter coagulans* No. 17 and 10.4 g/l for *Achromobacter coagulans* No. 49 (ATCC 21936), whereas the amount of L-lysine hydrochloride accumulated for *A. coagulans* No. 42 (ATCC 21934) and *Achromobacter coagulans* No. 36 (ATCC 21935) were found to be 0.4 g/l and 4.2 g/l, respectively.

The above results indicate that the resistance to norvaline and DL-α-amino-n-butyric acid can be increased by using these compounds alternately so that the lysine productivity of these microorganisms can be increased stepwise.

EXAMPLE 4

Valine-resistant strain, *Pseudomonas brevis* No. 56 (ATCC 21941) which had been obtained from *Pseudomonas brevis* No. 22 was cultivated on a bouillon agar slant medium at a temperature of 33°C overnight and then inoculated in a 2 *l* shake-flask containing 600 ml of the previously sterilized seed culture medium having the following composition followed by being shake-cultured at a temperature of 33°C for 24 hours:

| Seed Culture Medium: | |
|---|---|
| 75% phosphoric acid | 12 ml |
| $(NH_4)_2SO_4$ | 6 g |
| NaCl | 1 g |
| $MgSO_4.7H_2O$ | 0.2 g |
| $CaCl_2.2H_2O$ | 0.1 g |
| $FeSO_4.7H_2O$ | 0.1 g |
| $ZnSO_4.7H_2O$ | 0.03 g |
| $MnSO_4.7H_2O$ | 0.002 g |
| KOH | 14 g |
| tap water | 1000 ml |
| n-paraffin ($C_{11}$-$C_{18}$) | 7 ml |

600 ml portion of the above seed culture was inoculated in a jar fermentor containing 20 l of a sterilized fermentation medium having the following composition and the inoculated culture was cultivated at a temperature of 35°C by agitating at a rate of 800 rpm with aeration at a rate of 27 l/min.

| Fermentation Medium: | |
|---|---|
| n-paraffin ($C_{11}$-$C_{18}$) | 10% (w/v) |
| $K_2HPO_4$ | 0.1% |
| $KH_2PO_4$ | 0.1% |
| $MgSO_4.7H_2O$ | 0.1% |
| $FeSO_4.7H_2O$ | 0.002% |
| $ZnSO_4.7H_2O$ | 0.001% |
| $MnSO_4.4H_2O$ | 0.005% |
| Tween 85 | 0.05% |
| $(NH_4)_2SO_4$ | 1.0% |
| $CaCO_3$ | 1.0% |
| pH | 7.0 |

During the cultivation, the medium was adjusted to pH range of from 6 to 8 with an aqueous ammonia solution. The amount of L-lysine hydrochloride produced in the medium after 90 hours' cultivation was found to be 40.5 g/l (yield: about 40% based on the n-paraffin). The microbial cells were removed by centrifugation, and the L-lysine produced was adsorbed onto an ion-exchange resin in a usual manner. After elution by ammonia, the eluate was concentrated, and hydrochloric acid and then an alcohol were added thereto to obtain crystals weighing 35.3 g containing L-lysine hydrochloride having a purity more than 98% from 1 *l* of the culture broth.

EXAMPLE 5

A bouillon agar medium poured into a Houle bottle and then sterilized was inoculated with *Achromobacter coagulans* No. 49 (ATCC 21936) which had been cultivated on a slant medium. After the inoculated microorganism was cultured at a temperature of 33°C overnight, the culture was suspended in 300 ml of a sterilized physiological saline solution. 600 ml of the thus prepared suspension was inoculated into a 30 l jar fermentor containing 15 l of the medium having the same composition as described in Example 2 and cultivated at a temperature of 35°C with stirring at a rate of 500 rpm under aeration at a rate of 27 l/min. The pH value of the culture during the cultivation was adjusted to near neutral with an aqueous ammonia solution or hydrochloric acid. The amount of L-lysine hydrochloride accumulated after 80 hours' cultivation reached 13.4 g/l.

1 *l* of the culture broth was centrifuged in a usual manner to remove microbial cells and L-lysine was adsorbed onto an ion-exchange resin (Amberlite IRC-50) and then eluted with an aqueous ammonia solution. The eluate was concentrated, and hydrochloric acid and then an alcohol were added thereto to obtain 10.2 g of crystals of L-lysine hydrochloride.

While the invention has been described in detail and with reference to specific embodiments thereof, it will be apparent to one skilled in the art that various changes and modifications can be made therein without departing from the spirit and scope thereof.

What is claimed is:

1. A process for the production of L-lysine by fermentation which comprises cultivating aerobically an L-lysine-producing mutant strain of a microorganism belonging to the Genus Pseudomonas or belonging to *Achromobacter coagulans* ATCC 21934 which are the parent strains, in a culture medium containing a hydrocarbon as a main carbon source until a substantial amount of L-lysine is accumulated in the culture medium and recovering the thus accumulated L-lysine from the culture broth, said mutant strain being resistant to at least one amino acid or analogue thereof selected from the group consisting of L-valine α-aminobutyric acid, norvaline, β-hydroxynorvaline, α-amino-β-chlorobutyric acid and L-threonine.

2. A process according to claim 1 wherein said microorganism is a mutant strain of *Pseudomonas brevis* ATCC 21940.

3. A process according to claim 1 wherein said mutant strain is *Pseudomonas brevis* ATCC 21941.

4. A process according to claim 1 wherein said mutant strain is *Achromobacter coagulans* ATCC 21935 or ATCC 21936.

5. A process according to claim 1 wherein said hydrocarbon is kerosene or n-paraffin having 10 to 20 carbon atoms.

* * * * *